United States Patent [19]
Sotolongo

[11] 3,915,479
[45] Oct. 28, 1975

[54] CONNECTOR FOR FLEXIBLE CONDUIT
[75] Inventor: Thomas J. Sotolongo, Red Bank, N.J.
[73] Assignee: Thomas & Betts Corporation, Elizabeth, N.J.
[22] Filed: Nov. 29, 1974
[21] Appl. No.: 528,413

[52] U.S. Cl. .............. 285/158; 285/249; 285/382.7
[51] Int. Cl.² ....................................... F16L 33/20
[58] Field of Search ........ 285/249, 248, 382.7, 259, 285/250, 158, 162

[56] References Cited
UNITED STATES PATENTS

| | | | |
|---|---|---|---|
| 2,152,975 | 4/1939 | Sanford | 285/249 |
| 2,344,698 | 3/1944 | Howe | 285/382.7 X |
| 2,973,974 | 3/1961 | Disney | 285/253 X |
| 2,974,980 | 3/1961 | Boyle | 285/259 X |
| 3,219,367 | 11/1965 | Franck | 285/382.7 X |
| 3,378,282 | 4/1968 | Demler | 285/256 X |
| 3,659,880 | 5/1972 | Goldsobel | 285/248 X |
| 3,830,531 | 8/1974 | Burge | 285/249 X |
| 3,834,742 | 9/1974 | McPhillips | 285/249 |

FOREIGN PATENTS OR APPLICATIONS

| | | | |
|---|---|---|---|
| 723,052 | 12/1965 | Canada | 285/249 |
| 204,859 | 4/1965 | Sweden | 285/249 |

Primary Examiner—Thomas F. Callaghan
Attorney, Agent, or Firm—David Teschner; Jesse Woldman

[57] ABSTRACT

A connector fitting preferably for flexible nonmetallic conduit includes, in combination, an externally threaded hollow body member, a hollow tapered conduit supporting anvil, a resilient compression ring, and a gland nut, which elements may be preassembled to provide a structure in which the wall of the flexible conduit may be interposed between the outer surface of the anvil and the inner surface of the compression ring within one end of the body member, and the gland nut threadably tightened to radially compress the compression ring inwardly against the outer surface of the conduit which is internally supported by the anvil. Coacting inclined surfaces on the body member, gland nut, and the enlarged central portion of the compression ring serve to selectively direct the radial component of the forces applied to the compression ring which is internally recessed to permit uniform controlled collapse of the ring about the periphery of the conduit.

13 Claims, 8 Drawing Figures

CONNECTOR FOR FLEXIBLE CONDUIT

BACKGROUND OF THE INVENTION

1. Field of the Invention

The invention is directed to the field of fittings and particularly to an improved connector for flexible conduit.

2. Description of the Prior Art

Fittings and terminating connectors for both metallic and nonmetallic flexible conduit, according to the prior art, are variously exemplified in U.S. Pat. No. 3,659,880 issued May 2, 1972 to Goldsobel; U.S. Pat. No. 3,603,912 issued Sept. 7, 1971 to Kelly and assigned to the assignee of the instant invention; U.S. Pat. No. 3,549,177 issued Dec. 22, 1970 to Sotolongo and assigned to the assignee of the instant invention; U.S. Pat. No. 3,492,410 issued Jan. 27, 1970 to Kelly and assigned to the assignee of the instant invention; and U.S. Pat. No. 3,448,430 issued to Kelly and assigned to the assignee of the instant invention. The '410, '430, and '912 patents each disclose connectors for employment with a flexible metallic raceway or conduit, while the '177 and '880 patents disclose devices for use with a nonmetallic flexible conduit or raceway. The device disclosed in the '177 patent is fairly representative of those devices in which the conduit end is required to be flared or expanded outwardly during assembly leading to a distortion of the conduit with a high probability of fracture or splitting of the conduit wall in the area of expansion. A further disadvantage of this arrangement is the effect such distortion of the conduit has on the reusability aspects thereof since the user would be required to remove the broken, fractured, or distorted portion of the conduit after disassembly and prior to reassembly of the joint. In many cases, the resulting shortened conduit length would preclude further attachment to a fixed supporting structure, thereby requiring the replacement of a substantial length of the conduit to effect the reassembly thereof. The device disclosed in the '880 patent, although eliminating the need for expanding the conduit during assembly, requires the intrusion into the conduit wall of the sharpened ends of the castellated portion of the connector body upon assembly.

SUMMARY OF THE INVENTION

The invention overcomes the limitations and difficulties noted above with respect to prior art devices by providing a conduit fitting arranged to nondestructively and nondeformably couple one end of a flexible conduit to a further supporting structure in a rapid, convenient, and reliable manner. An elongate compression ring formed preferably from resilient plastic material comprises an enlarged annular central portion having selectively inclined sidewalls tapering outwardly in communication with flanking skirt portions the selectively internally recessed to provide a series of peripherally disposed collapsible interconnecting web portions of reduced thickness. The inclined sidewalls of the compression ring central portion are arranged to coact with mating tapered interior annular surfaces on a gland nut and connector body member to cause selective uniform compression of the compression ring about the outer surface of a flexible conduit inserted within the connector body member between the compression ring and a tapered anvil coaxially supported within a corresponding end of the body member. The compression ring and tapered anvil may be readily preassembled to the connector body member and the gland nut loosely threaded thereto prior to attachment of the conduit to avoid the burdensome task of handling multiple parts during the final assembly operation. The conduit may then be inserted into the connector body member and the gland nut tightened to effect a firm, uniform, liquid tight seal between the outer surface of the conduit and the connector. Disassembly is accomplished rapidly and conveniently by loosening the gland sufficiently to permit the compression ring to expand to its initial size thereby allowing the conduit to be safely withdrawn from the connector body without distortion or damage thereto. The process may be repeated almost indefinitely, where necessary, without affecting the security or integrity of the reassembled connection.

BRIEF DESCRIPTION OF THE DRAWINGS

In the drawings.

Similar elements are given similar reference characters in each of the respective drawings.

DESCRIPTION OF THE PREFERRED EMBODIMENTS

Figure 1:
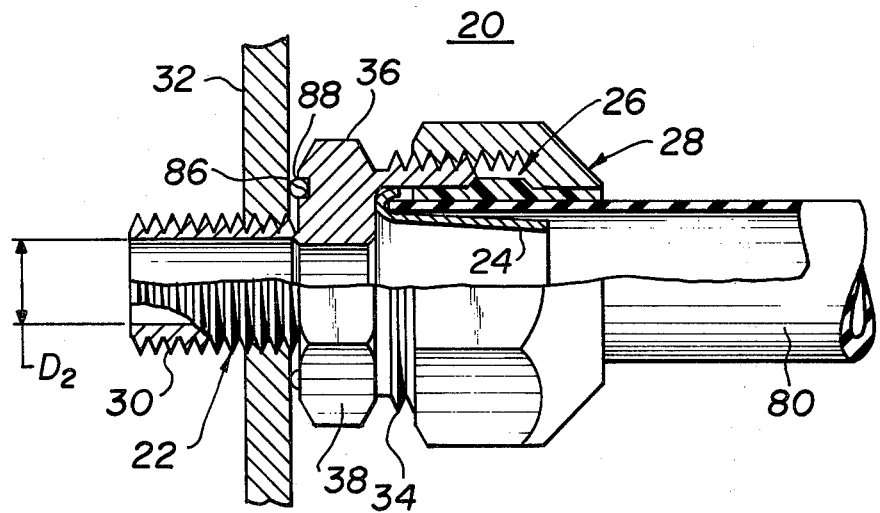
FIG. 1 is a side elevational view, partly cut away and partly in section, showing an assembly incorporating a connector constructed in accordance with the concepts of the invention.
Figure 2:
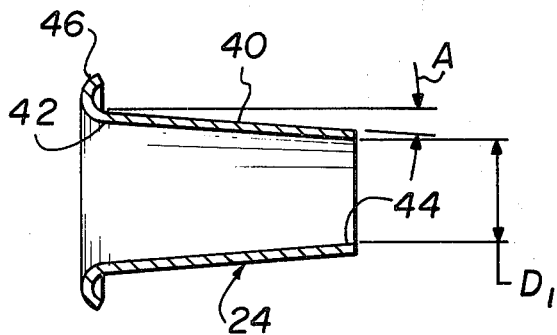
FIG. 2 is a side elevational view, in section, of the anvil of the device shown in FIG. 1.
Figure 3:
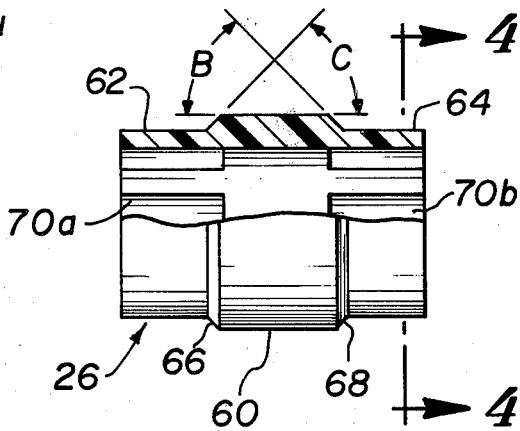
FIG. 3 is a side elevational view, partly cut away and partly in section, of the compression ring of the device of FIG. 1.
Figure 4:
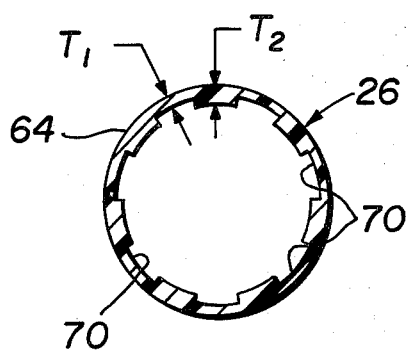
FIG. 4 is a sectional view of the compression ring taken along the line 4—4 of FIG. 3.
Figure 5:
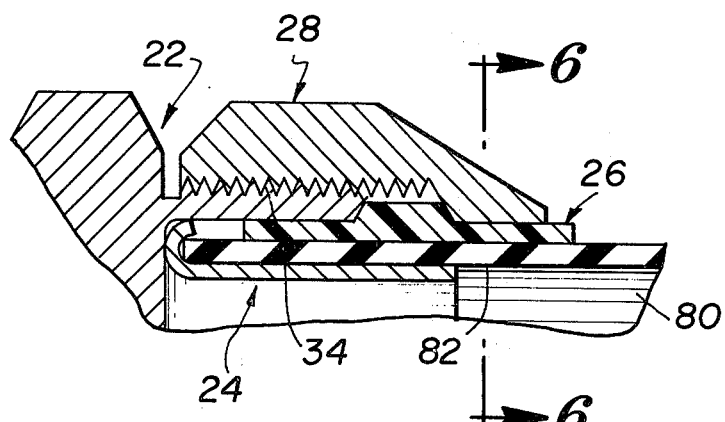
FIG. 5 is an enlarged fragmentary side elevational view, in section, of a portion of the assembly shown in FIG. 1, after tightening of the gland nut.
Figure 6:
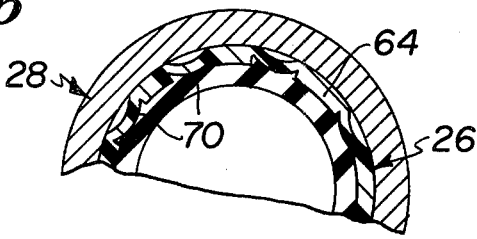
FIG. 6 is an enlarged sectional view taken along the line 6—6 of FIG. 5.
Figure 7:
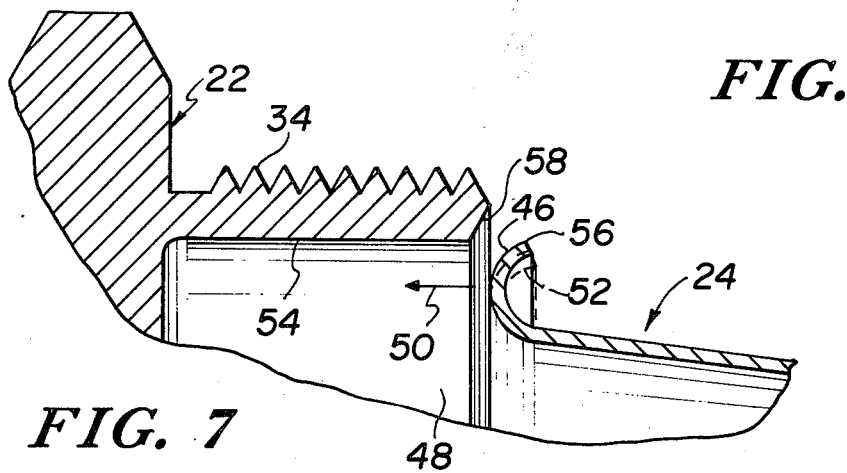
FIG. 7 is an enlarged fragmentary side elevational view, in section, of a portion of the anvil and body member of the device of FIG. 1 prior to assembly.
Figure 8:
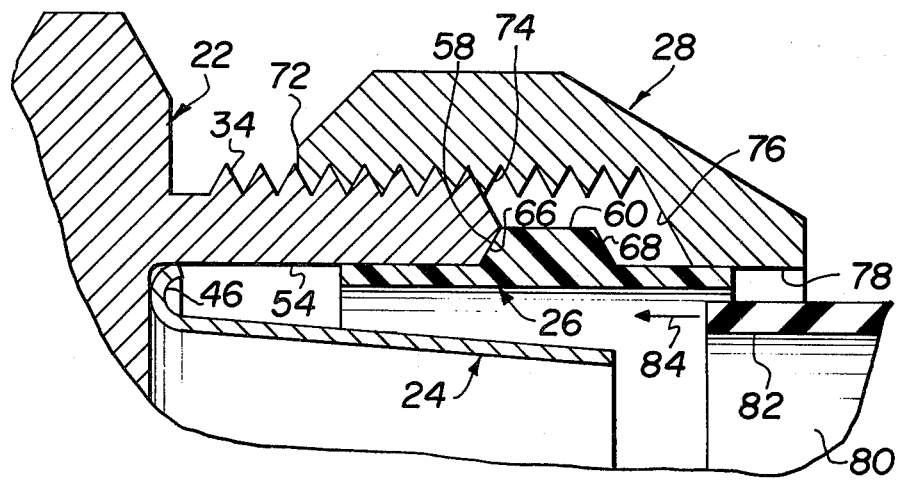
FIG. 8 is an enlarged framentary side elevational view, in section, showing a partial assembly of the gland nut, compression ring, body member, and anvil of the device of FIG. 1.

Turning now to FIGS. 1 through 8 there is shown a connector 20 preferably for flexible conduit constructed in accordance with the concepts of the invention. The connector comprises, in combination, an elongate body member 22, a hollow tapered anvil 24, a resilient compression ring 26, and a gland nut 28. The body member 22 comprises a first externally threaded portion 30 adapted to be threadably secured to a supporting panel such as 32 which may comprise an apertured wall of an electrical enclosure or the like, a second externally threaded portion 34 adapted to threadably receive the gland nut 28, and an enlarged intermediate or central portion 36 which may be provided with a series of flatted external faces 38 for gripping or rotating the body member 22. The anvil 24 is formed preferably of thin metallic stock and comprises a body portion 40 (FIG. 2) having a smooth exterior surface tapering preferably uniformly from a first end 42 towards a second end 44 at a slight angle "A" of from about 1° to 4°. Disposed about the periphery of the first or larger end 42 of the anvil 24 is a resilient annular lip 46 formed perferably integrally with the body portion 40 and arcuately shaped to provide a slight reverse bend, substantially as shown in FIG. 2, for locking engagement with the inner surface of the body member 22, the lip 46 being constructed to have an external diameter slightly larger than the internal diameter of the second threaded portion 34 of the body member 22. As illustrated in FIGS. 7 and 8, the anvil 24 is telescopingly assembled to the interior of the body member 24 adjacent the second threaded portion 34 by positioning its lip 46 adjacent the body member 22 and coincident with an opening 48 at the right hand side of the body member 22, as viewed in FIG. 7, and then advancing the anvil 24 in a direction indicated by the arrow 50 into the interior of the body member 22 to a position substantially as shown in FIG. 8. The lip 46, being resilient, is caused to be deflected inwardly towards the body portion 40 of the anvil 24, as shown by the dotted outline 52 in FIG. 7, as the anvil 24 is inserted within the body member 22, thereby exerting a continuous pressure against an interior wall 54 of the body member 22. As further shown in FIG. 7, the lip 46 may be provided with a relatively sharp annular edge 56 which may be effectively employed to bite into the surface of the wall 54 and secure the anvil in position when fully inserted within the body member 22, as illustrated in FIG. 8, thus insuring coincidence between the longitudinal axis of the anvil 24 and the longitudinal axis of the body member 22. As further shown in detail in FIG. 7, the body member 22 is additionally provided with an annular inclined surface 58 extending from the terminating end of the second externally threaded portion 34 of the body member 22 to the interior wall 54 thereof, the function of which will be described hereafter. As illustrated in detail in FIGS. 3 and 4, the compression ring 26 is formed preferably from a resilient plastic material having sufficient recovery characteristics to permit a relatively wide degree of deformation without permanent effect, and may include such materials as nylon, plyethylene, and polypropylene. The ring 26 may, accordingly, be molded or shaped into the desired form to provide an enlarged annular central portion 60 and preferably symmetrical flanking skirt portions 62 and 64 extending longitudinally outwardly in opposite directions from the central portion 60 and joined thereto by respective annular inclined surfaces 66 and 68, said surfaces 66 and 68 being disposed preferably at equal but opposite angles of inclination "B" and "C" of about 20° to the longitudinal axis of the ring 26. Although the exact angle of inclination is not critical, it is recommended that the angle be less than 45° to insure proper compression of the ring 26, as will be described hereafter. It has been found, however, that an angle of inclination of approximately 20° will tend to distribute the forces applied to the ring 26 in such manner as to provide for a generally constant uniform inwardly directed compression of the ring without undue effort or distortion. To further assist in reducing the force required to compress the ring 26, the skirt portions 62 and 64 thereof are each provided with a series of spaced recesses 70 (FIG. 3) extending longitudinally respectively from each end of the ring 26 within the interior thereof and terminating within the region encompassed by the respective inclined surfaces 66 and 68. That is, the recessed portions 70a extending inwardly from the left hand skirt portion 62, as viewed in FIG. 3, terminate within the segment of the ring 26 bordered by the inclined surface 66, and the recessed portions 70b extending inwardly from the right hand skirt portion 64 terminate within the segment of the ring 26 bordered by the inclined surface 68. The recessed portions 70 are selectively proportioned, with respect to the depth thereof, to provide a wall thickness $T_1$ (FIG. 4) somewhat less than the wall thickness $T_2$ (FIG. 4) of the adjacent non-recessed area of the skirt portions 62 and 64. Accordingly, the ring 26 will tend to contract in the manner shown in FIG. 6, that is, each of the recessed portions 70 will tend to collapse radially inwardly between the adjacent nonrecessed segments under the compressive force applied by the gland nut 28 and the inclined surface 58 of the body member 22, as will be described hereafter.

The gland nut 28 comprises a first or forward end 72 (FIG. 8) communicating with an internally threaded portion 74 designed to mate with the second externally threaded portion 34 of the body member 22. The threaded portion 74 extends longitudinally inwardly along the interior of the gland nut 28 a given distance to communicate with an inclined annular surface 76 disposed between the threaded portion 74 and an inner annular surface 78 of preferably uniform diameter essentially equal to the outer diameter of the skirt portions 62 and 64 of the compression ring 26. The inclined surface 76 is designed to have an angle of inclination, with respect to the longitudinal axis of the gland nut 28, preferably equal to the angle of inclination of the inclined surface 68 of the compression ring 26 so as to provide closely mating surfaces thereat as the gland nut is threadably tightened on the body member 22. The cooperative relationship between these two surfaces 76 and 68 may be more clearly seen in FIG. 5 in which the gland nut 28 is shown in a substantially fully advanced position on the second threaded portion 34 of the body member 22. Similarly, the corresponding angle of inclination of the inclined annular surface 58 of the body member 22 is preferably equal to the angle of inclination of the annular inclined surface 66 of the compression ring 26 in order to provide similar mating surfaces thereat. For the sake of symmetry and manufacturing convenience, it will readily be appreciated that all four annular inclined surfaces 58, 66, 68, and 76 may have equivalent angles of inclination. Furthermore, the compression ring 26 may be symmetrically configured for universal orientation within the body member 22.

As further illustrated in FIG. 8, the connector 20 is so constructed that the anvil 24, compression ring 26, and gland nut 28 may be preassembled to the body member 22, essentially as shown, prior to the receipt therein of a flexible nonmetallic conduit such as 80 having a wall 82. The conduit 80 is then inserted into the connector in the direction shown by the arrow 84 in FIG. 8. The minimum annular gap between the outer surface of the anvil 24 and the inner surface of the ring 26 is proportioned preferably to be slightly greater than the thickness of the conduit wall 82 to permit the free unencumbered insertion of the conduit 80 into the connector 20. After the conduit 80 is seated fully within the connector, the gland nut 28 is threadably advanced along the second threaded end 34 of the body member 22 so that its inclined annular interior surface 76 abuts the compression ring surface 68, urging the opposing compression ring surface 60 against the adjacent surface 58 of the body member 22. Further tightening of the gland nut 28 causes the compression ring 26, by virtue of the radial component of the forces exerted on its inclined surfaces 66 and 68, to contract about the outer surface of the conduit 80, in the manner shown generally in FIG. 6, thus securely locking the conduit 80 to the connector 20 and providing a liquid tight seal between the inner surface of the compression ring 26 and the adjacent exterior surface of the conduit 80, without expanding, distorting, or otherwise affecting the initial shape of the conduit wall 82. Accordingly, the conduit 80 may be safely repeatedly removed from and reassembled to the connector 20 simply by respectively loosening and retightening the gland nut 28. It should also be noted that the compression ring 26 is appropriately proportioned to collapse sufficiently to cause the interior surface of the conduit 80 to abut the outer surface of the anvil 24 along substantially the entire length of the latter, despite the slight taper "a" of the anvil body portion 40. The tubular shape of the anvil body portion 40 provides a relatively rigid support for the conduit 80 against the pressure exerted thereon by the compressing ring 26. The smooth exterior surface of the anvil body portion 40 also serves to insure that the interior surface of the conduit wall is unaffected by the assembly operation. To provide a uniform opening between the interior of the conduit 80 and the interior of the connector 20, where necessary or desirable, the anvil 24 may be selectively proportioned, to have a minimum inner diameter "$D_1$" (FIG. 2) preferably equal to the inner diameter "$D_2$" (FIG. 1) adjacent the first threaded portion 30 of the body member 22.

Where the connector 20 is to be employed to connect the conduit 80 to a supporting wall 32 which may comprise the side panel of an electrical enclosure (not shown) or the like, the enlarged portion 36 of the body member 22 may be provided with an annular seal receiving recess such as 86 (FIG. 1) in which is disposed a preferably resilient seal ring 88 to provide a further liquid tight seal between the enlarged portion 36 of the body member 22 and the adjacent surface of the supporting wall 32.

Although there has been shown and described a connector for flexible conduit according to a specific embodiment, it will be readily apparent to those skilled in the art that various modifications and alterations may be made thereto with regard to the specific shapes, sizes, and materials disclosed herein without departing from the spirit of the invention and within the concepts herein disclosed.

The embodiments of the invention in which an exclusive property or privilege is claimed are defined as follows:

1. A connector for flexible conduit comprising, in combination: a hollow elongate body member having a first externally threaded portion adjacent a first end, a second externally threaded portion adjacent its second end, and an enlarged portion therebetween for gripping said body member; a hollow tubular anvil having a continuously longitudinally tapered body portion of uniform thickness and a resilient annular lip portion, said lip portion extending outwardly from and circumscribing said second end of said body portion, said second end having a uniform inner diameter, said second end inner diameter being larger than the inner diameter of said first end, said anvil being arranged for insertion within said body member generally adjacent said second threaded portion thereof, said lip portion being proportioned to tightly engage the inner surface of said body member to maintain said anvil in a given position within said body member; a resilient plastic hollow elongate compression ring having an enlarged annular central portion and first and second skirt portions, said first and second skirt portions extending longitudinally outwardly in opposite directions from said central portion, said central portion having an annular inclined outer surface extending respectively from each side of said central portion and communicating with a respective one of said first and second skirt portions, said compression ring having an interior surface having a series of spaced, selectively formed recessed portions extending inwardly from each end of said compression ring towards said central portion a given distance to selectively reduce the thickness of said compression ring thereat, at least one of said compression ring first and second skirt portions having an outer diameter generally equal to said body member second end inner diameter and arranged to fit snugly within said body member generally adjacent said second threaded end thereof; and a gland nut having a first end and a second end, said gland nut having an internally threaded portion adjacent said first end thereof and an inner annular surface having a generally uniform diameter and given length adjacent said second end thereof, said internally threaded portion and said inner annular surface of said gland nut being joined by a selectively inclined annular surface, said gland nut internally threaded portion being threadably engageable with said body member second externally threaded portion and said gland nut annular surface of generally uniform diameter being arranged to closely overlie an extending one of said compression ring first and second skirt portions upon the assembly of said compression ring into said body member and the threaded attachment of said gland nut to said body member second threaded portion; the internal diameter of said compression ring and the external diameter of said anvil body portion being proportioned with respect to one another to provide a uniformly tapering annular gap extending the entire length of said anvil body portion for receiving the wall of a flexible conduit therebetween wherein, upon the assembly of said anvil, compression ring, and gland nut to said body member, one end of a flexible conduit may be inserted into said body member so that its wall is disposed in said tapered annular gap intermediate said anvil and said compression ring, and said gland nut tightened onto said body member second threaded portion to radially compress said compression ring to a given tightness about the exterior surface of the contained wall of the flexible conduit, said body member second threaded portion terminating at an end portion having an inclined annular surface tapering inwardly from the exterior surface of said end portion to the interior surface of said body member, said body member end portion inclined surface being disposed at a given angle to the longitudinal axis of said body member substantially equivalent to the angle of inclination of at least one of said compression ring inclined surfaces.

2. A connector as defined in claim 1 wherein the angle of inclination of said end portion inclined surface is in the range of from about 10° to about 30°.

3. A connector as defined in claim 1 wherein the angle of inclination of said end portion inclined surface is in the range of from about 15° to about 20°.

4. A connector as defined in claim 1 wherein the longitudinal length of said gland nut inner annular surface of generally uniform diameter is selectively shorter than the length of a corresponding one of said compression ring first and second skirt portions disposed adjacent thereto upon the assembly of said gland nut and said compression ring to said body member.

5. A connector as defined in claim 1 wherein said compression ring recessed portions terminate within the region encompassed by a respective one of said central portion inclined surfaces joining a respective skirt portion to said central portion of said compression ring.

6. A connector as defined in claim 1 wherein said anvil body portion tapers inwardly from the larger end thereof at an angle of from about 1° to about 3° to the longitudinal axis of said anvil body portion.

7. A connector as defined in claim 1 wherein said compression ring annular inclined surfaces have substantially equal but opposite angles of inclination.

8. A connector as defined in claim 7 wherein said body member end portion inclined annular surface and said gland nut annular inclined surface have substantially equal but opposite angles of inclination.

9. A connector as defined in claim 1 further comprising seal means interposed adjacent the juncture between said body member first threaded portion and said body member enlarged portion to provide a liquid tight seal between said body member and the adjacent surface of a support member to which said connector is attached.

10. A connector as defined in claim 1 wherein the minimum inner diameter of said anvil is at least equal to the inner diameter of said body member along the length of said first threaded portion thereof.

11. A connector as defined in claim 1 wherein the wall thickness of said compression ring in the area of said recessed portion is less than the wall thickness of said compression ring in the area adjacent thereto.

12. A connector as defined in claim 11 wherein said compression ring recessed portions are generally equally spaced about the inner surface of said respective skirt portions.

13. A connector as defined in claim 12 wherein each of said recessed portions subtends an arc greater than the arc subtended by each of the non-recessed portions separating said recessed portions from one another.

* * * * *